O. U. BEAN.
METHOD OF PRODUCING GAS.
APPLICATION FILED APR. 5, 1919.

1,337,537.

Patented Apr. 20, 1920.
2 SHEETS—SHEET 1.

Inventor
O. U. Bean
by Browne & Phelps
Attorneys.

O. U. BEAN.
METHOD OF PRODUCING GAS.
APPLICATION FILED APR. 5, 1919.

1,337,537.

Patented Apr. 20, 1920.
2 SHEETS—SHEET 2.

Inventor
O. U. Bean
by Browne Phelps
Attorneys.

UNITED STATES PATENT OFFICE.

ORESTES U. BEAN, OF NEW YORK, N. Y.

METHOD OF PRODUCING GAS.

1,337,537.

Specification of Letters Patent.   Patented Apr. 20, 1920.

Application filed April 5, 1919.   Serial No. 287,854.

*To all whom it may concern:*

Be it known that I, ORESTES U. BEAN, a citizen of the United States, residing at New York, in the county of New York and State of New York, have invented certain new and useful Improvements in Methods of Producing Gas, of which the following is a specification.

This invention relates to a method of producing gas for light, heat and power purposes.

One of the objects of the present invention is to provide a simple, practical, and continuous method of manufacturing a superior and non-asphyxiating gas. A second object is to provide a commercially practicable and inexpensive method of producing such gas. A further object is to provide a method, or process for producing such superior and non-poisonous gas cheaply and which will be highly efficient in varied usage. Other objects will be in part obvious and in part hereinafter pointed out.

The present invention, accordingly consists in the several steps and the relation and order of one or more of such steps with relation to each of the others thereof, as will be exemplified in the method hereinafter disclosed and the scope of the application which will be indicated in the following claims.

In the accompanying drawing wherein is shown one of various possible embodiments of the apparatus for carrying out the herein disclosed method—

Similar reference characters denote corresponding parts in the different views.

Figure 1:
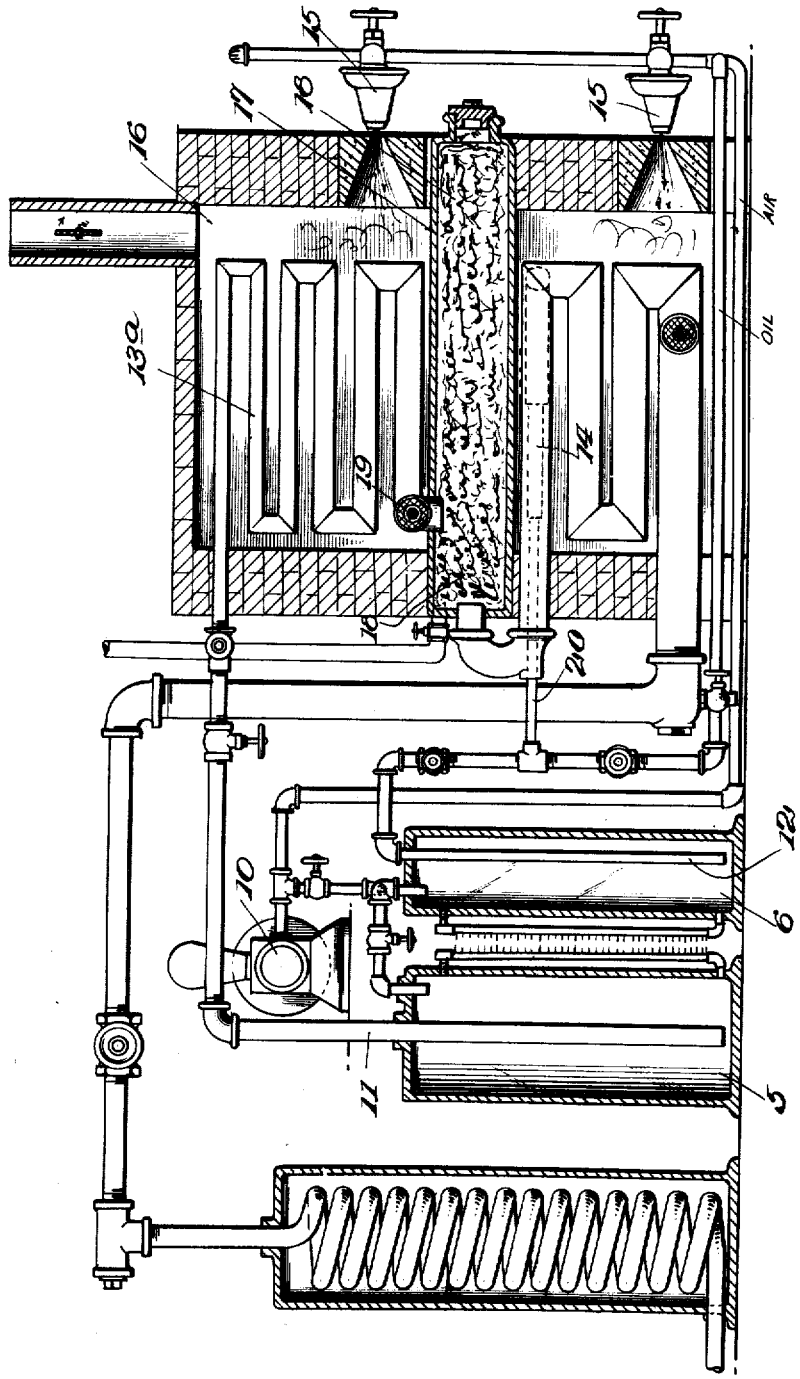
Figure 1 is a semi-diagrammatic sectional elevational view of the complete apparatus.
Figures 2, 3:
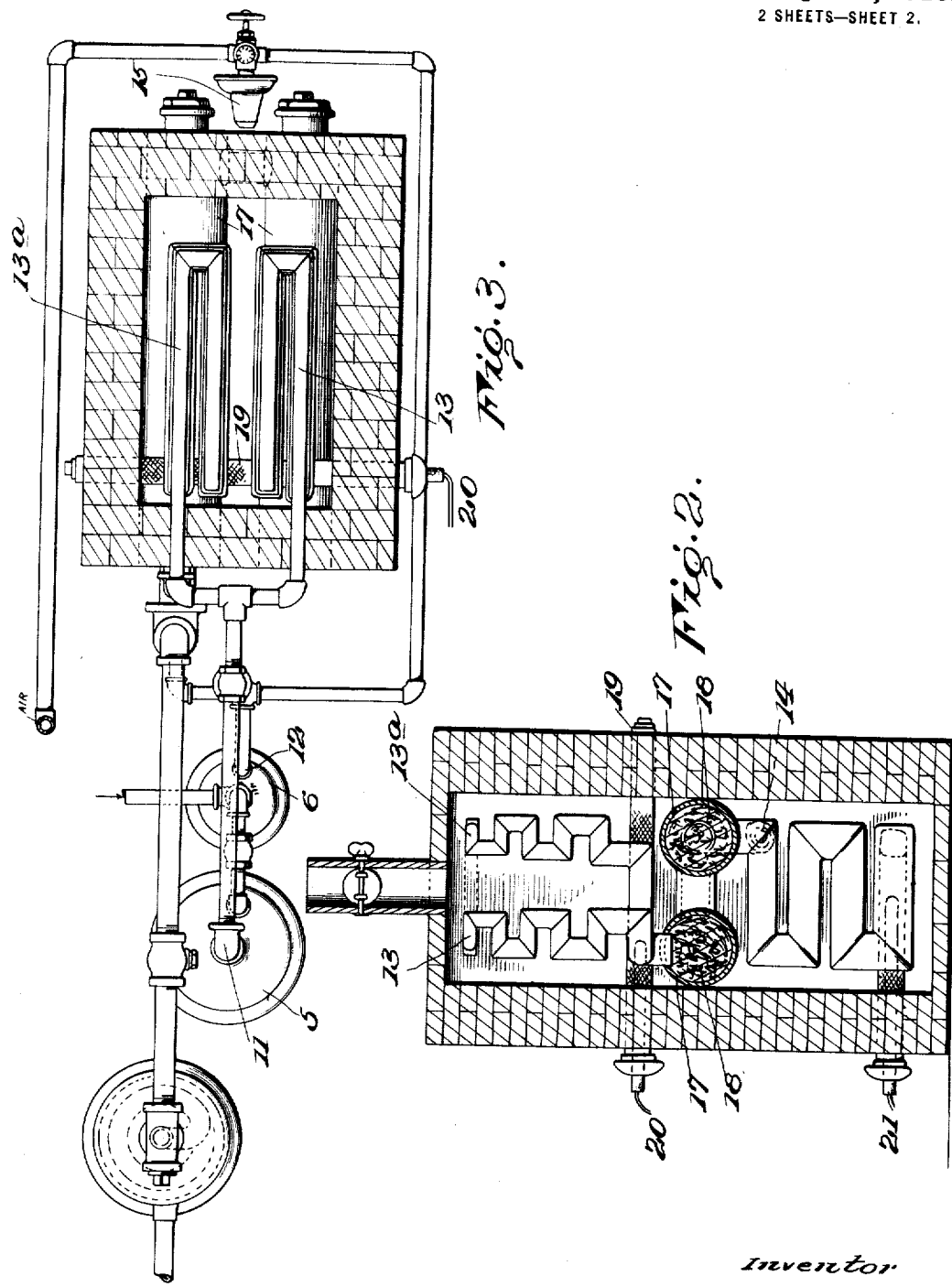
Fig. 2 is a transverse sectional elevation on line $x$—$x$, Fig. 1.
Fig. 3 is a plan view of the apparatus shown in Fig. 1, certain parts being shown in section as indicated in dotted lines for clearness.

Referring now to the drawing in detail and more particularly to Fig. 1 wherein is shown diagrammatically a complete apparatus or generator designed for the purpose of producing what may be termed a hydrogen, hydrocarbon, gas for illuminating, heating, brazing, cutting, welding, smelting, or other light, heat or power purposes with a view to conserving energy at a greatly reduced cost of manufacture as compared with present prevailing systems in general use.

In order that the present invention may be more clearly understood it may be stated in brief that the hydrogen gas is produced by superheating steam, in one or more substantially closed conduits or receptacles at a relatively high temperature, thereafter abstracting the oxygen by passing the elements into proximity with a suitable material such as through heated iron-filings, turnings, slugs or the like. In making the hydrocarbon gas there is introduced a hydrocarbon such as oil through a separate conduit which is vaporized at approximately the same temperature as the hydrogen aforesaid, joining the elements,—hydrogen and carbon—in one common and preferably continuously enlarging conduit and subjecting them to rising temperatures until that temperature is attained whereat the hydrogen has an affinity for the carbon and joins same in a fixed state.

By this treatment of the elements under proper temperatures to be hereinafter stated they will not return to their original form and may be immediately used or indefinitely stored under all weather conditions for future use for lighting, heating or power purposes, as desired.

In carrying out this process there is provided two tanks 5 and 6 adapted to contain water and oil, respectively. These tanks are supplied with gages with indicating numerals, unless other provision is made for measuring the oil and water used and are under pressure such as furnished by a pump 10 whereby the contents are forced out through pipes 11 and 12 extending to near the lower parts of the tanks and are connected with separate conduits 13 and 13ª for water and 14 for oil, all preferably of constantly increasing diameter positioned in a generating retort chamber 16 which is heated in any desired manner but preferably by oil or gas flame from burners 15 so directed and baffled that a more even and uniform temperature may be obtained and distributed with desired heat at desired points.

The water which has previously been converted into steam and superheated to 780° F., or above, in conduits 13 and 13ª, is connected with a chamber, or chambers 17 containing iron 18 in suitable preparation for abstraction of the oxygen.

The process of manufacturing these gases is variable as follows:

*Hydrogen gas.*—The water is boiled into steam and the steam is superheated to a temperature of approximately 780° F. in the tubes 13ª. The steam is passed through this common conduit into and through a chamber or chambers 17 filled with iron, as previously stated, and which will abstract the oxygen leaving the hydrogen gas free. The hydrogen gas may be drawn off from the chamber 17 by the pipe 18.

*Hydro-carbon gas.*—The hydrogen is joined in a conduit by a hydrocarbon binder of oil or other carbonaceous substance, which has been introduced through a separate conduit 20, and raised by heat to approximately the same temperature as the superheated steam and the hydrocarbon: hydrogen and hydrocarbon, proceed through one common and, preferably gradually enlarging conduit 14 under rising temperatures to cause the cracking of the hydrocarbon and resulting in the formation of free carbon until gasification (approximately 1180° F. to 1200° F.), is attained, at which temperature the hydrogen and the free carbon, having an affinity for each other unite and become a fixed hydrocarbon gas.

Any of the above enumerated gases may be manufactured by this process in any desired ratio of water to oil up to or even exceeding 19 parts of water to one of oil as desired, to conform to illuminant and heat demands.

These gases may be cooled, washed, scrubbed, purified, tanked, stored, distributed, etc., as are like gases in commercial use manufactured under other processes.

It is of course to be understood that valves are positioned where desired and necessary and the parts are subject to variations in form, arrangements and modifications without departing from the spirit and scope of the invention. Pyrometers 20 and 21 are suitably positioned as temperature indicators.

It should be noted that the hydrocarbon gas is non-poisonous, non-asphyxiating, the temperature of combustion not being attained within the conduits or chambers. The gas thus obtained is capable of producing higher temperatures than ordinary "water gas" or "coal gas" and the flame is more illuminating, its B. T. U.'s and cp. being approximately double that of best of such present commercial gases.

What I claim is:

1. The herein described method of producing gas which consists in heating hydrocarbon and water separately to approximately 780° F., abstracting the oxygen from the steam by the action of iron before introduction of hydrocarbon and passing the hydrogen and hydrocarbon at the same or higher temperature through a common conduit under rising temperatures until gasification, approximately 1180° F. to 1200° F. is attained at which temperature the hydrogen and carbon will combine into a fixed gas.

2. The herein described method of producing gas from water and oil, which consists in sustaining by combustion or otherwise of sufficient heat to admit of generating steam from the water, superheating said steam, passing the superheated steam through iron in heated condition to abstract the oxygen and liberate the hydrogen, vaporizing the oil and raising it to approximately the temperature of the hydrogen and adding the same thereto, passing the mixture through a common conduit, and raising the temperature of the mixture to gasification.

In testimony whereof I affix my signature in presence of two witnesses.

ORESTES U. BEAN.

Witnesses:
 FRANCIS M. PHELPS,
 K. E. KLEIN.